US012579908B2

(12) United States Patent
Wang et al.

(10) Patent No.: US 12,579,908 B2
(45) Date of Patent: Mar. 17, 2026

(54) MARINE DYNAMIC ENVIRONMENT SIMULATION TEST SYSTEM AND TEST METHOD

(71) Applicants: Southern Marine Science and Engineering Guangdong Laboratory (Zhuhai), Zhuhai (CN); Sun Yat-sen University, Guangzhou (CN)

(72) Inventors: Fuming Wang, Guangzhou (CN); Chengchao Guo, Guangzhou (CN); Haibo Wang, Guangzhou (CN); Dingfeng Cao, Guangzhou (CN)

(73) Assignee: Southern Marine Science and Engineering Guangdon Laboratory, Zhuhai City (CN)

( * ) Notice: Subject to any disclaimer, the term of this patent is extended or adjusted under 35 U.S.C. 154(b) by 888 days.

(21) Appl. No.: 17/819,343

(22) Filed: Aug. 12, 2022

(65) Prior Publication Data

US 2023/0409765 A1 Dec. 21, 2023

(30) Foreign Application Priority Data

May 25, 2022 (CN) .......................... 202210580331.1

(51) Int. Cl.
*G01N 17/00* (2006.01)
*G01N 19/00* (2006.01)
*G09B 23/40* (2006.01)
(52) U.S. Cl.
CPC .......... *G09B 23/40* (2013.01); *G01N 17/002* (2013.01); *G01N 19/00* (2013.01)
(58) Field of Classification Search
CPC ....... G01N 17/002; G01N 19/00; G09B 23/40
See application file for complete search history.

(56) References Cited

U.S. PATENT DOCUMENTS 12,014,653 B2 * 6/2024 Zhang ................... G09B 23/40

FOREIGN PATENT DOCUMENTS

CN 102680385 A 9/2012
CN 205886308 U 1/2017
(Continued)

OTHER PUBLICATIONS

Office Action issued to Chinese counterpart application CN202210580331.1 dated Apr. 1, 2025.

*Primary Examiner* — Kristina M Deherrera
*Assistant Examiner* — Jean F Morello
(74) *Attorney, Agent, or Firm* — McNees Wallace & Nurick

(57) ABSTRACT

A marine dynamic environment simulation test system and a test method are provided. The system includes a test chamber, a seawater erosion unit, a climate simulation unit and a force loading device. The bottom of the test chamber is provided with a simulated seabed structure model for supporting a test piece. The seawater erosion unit includes a sedimentation tank containing seawater and a circulation mechanism. The circulation mechanism is capable of making the seawater in the sedimentation tank circulate in the sedimentation tank and the test chamber and controlling the water level and the flow rate of the seawater in the test chamber. The climate simulation unit is capable of performing at least one of ultraviolet irradiation, high temperature irradiation, sea wind simulation or rain and fog simulation on the test piece. The force loading device loads force in a preset direction on the test piece.

10 Claims, 2 Drawing Sheets

(56)             References Cited

FOREIGN PATENT DOCUMENTS

| | | | |
|---|---|---|---|
| CN | 110987782 | A | 4/2020 |
| CN | 111445771 | A | 7/2020 |
| CN | 113640131 | A | 11/2021 |
| WO | 2021036762 | A1 | 3/2021 |

* cited by examiner

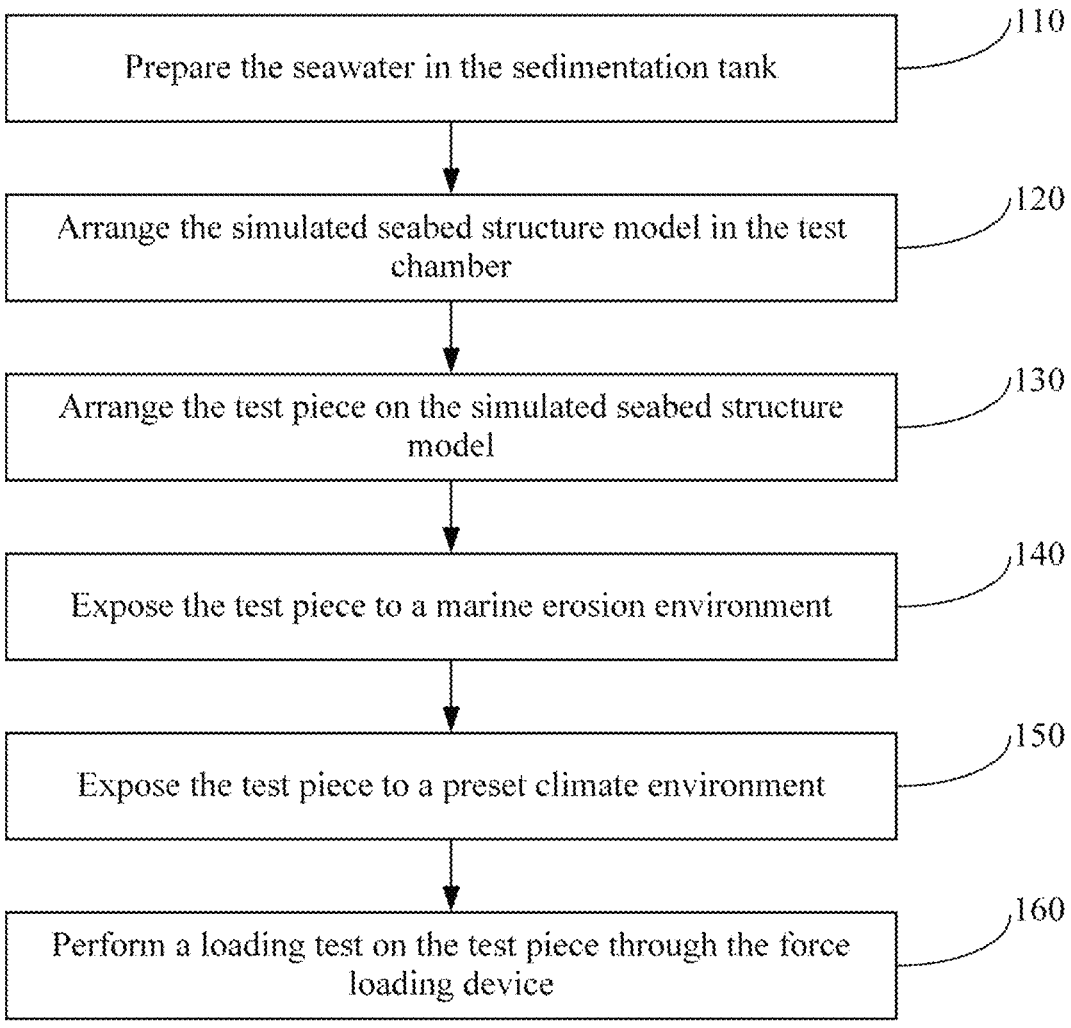

Prepare the seawater in the sedimentation tank ⟋110

Arrange the simulated seabed structure model in the test chamber ⟋120

Arrange the test piece on the simulated seabed structure model ⟋130

Expose the test piece to a marine erosion environment ⟋140

Expose the test piece to a preset climate environment ⟋150

Perform a loading test on the test piece through the force loading device ⟋160

FIG. 2

MARINE DYNAMIC ENVIRONMENT SIMULATION TEST SYSTEM AND TEST METHOD

TECHNICAL FIELD

The present disclosure relates to the field of environment simulation system technologies, in particular, a marine dynamic environment simulation test system and a test method.

BACKGROUND

Compared with the underground structure in the traditional land area, the underground construction, such as subsea tunnels and island reef underground spaces, is surrounded by rock mass and limitless and corrosive seawater and thus is prone to frequent structural leakage and water inrush disasters. As a result, destructive disasters often occur. Especially, under the action of long-term seawater erosion and dynamic water level variation, the risk of water-related catastrophe of the underground construction is further aggravated, which seriously threatens the long-term operation safety of the underground construction. Therefore, it is of great significance to accurately reveal the mechanism of the water-related catastrophe of the underground construction in the marine dynamic environment to guide the prevention and control of water-related disaster in the process of construction and operation. At present, due to the advantages of controllable conditions, short test periods and high efficiency, the indoor environment simulation test has been widely used in the durability research of structures in the marine environment.

However, the current simulation test equipment can only simulate simple changes in the external environment and cannot satisfy more stringent requirements for marine dynamic environment simulation.

SUMMARY

The present disclosure aims to provide a marine dynamic environment simulation test system and a test method, so as to solve the problem in the related art that the current simulation test equipment can only simulate simple changes in the external environment and cannot satisfy more stringent requirements for marine dynamic environment simulation.

In one aspect, the present disclosure provides a marine dynamic environment simulation test system. The marine dynamic environment simulation test system includes a test chamber, a seawater erosion unit, a climate simulation unit and a force loading device.

The bottom of the test chamber is provided with a simulated seabed structure model for supporting a test piece.

The seawater erosion unit includes a sedimentation tank containing seawater and a circulation mechanism. The circulation mechanism is capable of making the seawater in the sedimentation tank circulate in the sedimentation tank and the test chamber and controlling the water level and the flow rate of the seawater in the test chamber.

The climate simulation unit is capable of performing at least one of ultraviolet irradiation, high temperature irradiation, sea wind simulation or rain and fog simulation on the test piece.

The force loading device is configured to load force in a preset direction on the test piece.

In an example solution of the system, a plurality of baffles are sequentially disposed in the sedimentation tank, the plurality of baffles divide the sedimentation tank into a plurality of accommodation cavities and sequentially decrease in height in a vertical direction.

In an example solution of the system, the circulation mechanism includes a first water pump and a second water pump. A water inlet of the first water pump communicates with a water outlet of the test chamber, and a water outlet of the first water pump communicates with an accommodation cavity formed by the sedimentation tank and a baffle which is the highest in the vertical direction among the plurality of baffles. A water inlet of the second water pump communicates with an accommodation cavity formed by the sedimentation tank and a baffle which is the lowest in the vertical direction among the plurality of baffles, and a water outlet of the second water pump communicates with a water inlet of the sedimentation tank.

In an example solution of the system, the circulation mechanism further includes a water level sensor and a flow rate sensor. The water level sensor and the flow rate sensor are each disposed in the test chamber for respectively measuring the water level and the flow rate of the seawater in the test chamber.

In an example solution of the system, the system further includes a plurality of reaction force supports and a plurality of silt filter plates. The plurality of reaction force supports respectively support the plurality of silt filter plates to make the plurality of silt filter plates form a test cavity, so that the test cavity encloses the test piece.

In an example solution of the system, the climate simulation unit includes a rain and fog simulation mechanism. The rain and fog simulation mechanism includes a water box, a third water pump and a spray plate. The spray plate is disposed in the test chamber and located on the side of the test piece away from the simulated seabed structure model, a water inlet of the third water pump communicates with the water box, and a water outlet of the third water pump communicates with the spray plate.

In an example solution of the system, the test chamber is provided with two opposite vents.

The climate simulation unit includes a sea wind simulation mechanism which includes a blower and a duct, two ends of the duct respectively communicate with the two vents of the test chamber, the two vents are respectively set as a trumpet shape, and the blower is disposed at one of the two ends of the duct.

In an example solution of the system, the climate simulation unit includes a plurality of ultraviolet spotlights and a plurality of high temperature spotlights. The plurality of ultraviolet spotlights are configured to perform ultraviolet irradiation on the test piece, and the plurality of high temperature spotlights are configured to perform high temperature irradiation on the test piece.

In an example solution of the system, a plurality of cameras are further included for photographing the test piece.

In another aspect, the present disclosure provides a test method applied to the system of any one of the preceding solutions. The test method includes steps described below.

The seawater is prepared in the sedimentation tank.

The simulated seabed structure model is arranged in the test chamber.

The test piece is arranged on the simulated seabed structure model.

The test piece is exposed to a marine erosion environment.

The test piece is exposed to a preset climate environment.

A loading test is performed on the test piece through the force loading device.

The present disclosure has beneficial effects described below.

The present disclosure provides a marine dynamic environment simulation test system and a test method. The system includes a test chamber, a seawater erosion unit, a climate simulation unit and a force loading device. The bottom of the test chamber is provided with a simulated seabed structure model for supporting a test piece. The seawater erosion unit includes a sedimentation tank containing seawater and a circulation mechanism, and the circulation mechanism is capable of making the seawater in the sedimentation tank circulate in the sedimentation tank and the test chamber and controlling the water level and the flow rate of the seawater in the test chamber. The climate simulation unit is capable of performing at least one of ultraviolet irradiation, high temperature irradiation, sea wind simulation or rain or fog simulation on the test piece. The force loading device is configured to load force in a preset direction on the test piece. Island reef infrastructure and subsea tunnels are in the marine environment for a long time, which has a serious impact on the structures and service life of the island reef infrastructure or the subsea tunnels. Therefore, it is necessary to research on the structure of the marine environment by using the system. Firstly, the test piece is prepared according to the structures of the reef infrastructure and the subsea tunnels, where the test piece has the same composition and is produced by the same construction technology as the island reef infrastructure or the subsea tunnels; the required seawater is prepared in the sedimentation tank; then, the simulated seabed structure model is arranged in the test chamber, where the simulated seabed structure model has the same structure as the real seabed; the test piece is arranged on the simulated seabed structure model; the test piece is exposed to a seawater erosion environment; the test piece is exposed to a preset climate environment; the loading test is performed on the test piece through the force loading device, where the force loading device may simulate the load on the pavement or the underground structure. Through the test system and the test method, the force loading test in the complex marine climate environment can be simulated, which is convenient for people to research on the island reef infrastructure and the subsea tunnels.

BRIEF DESCRIPTION OF DRAWINGS

FIG. 2 is a flowchart of a test method based on a marine dynamic environment simulation test system according to an embodiment of the present disclosure.

Figure 1:
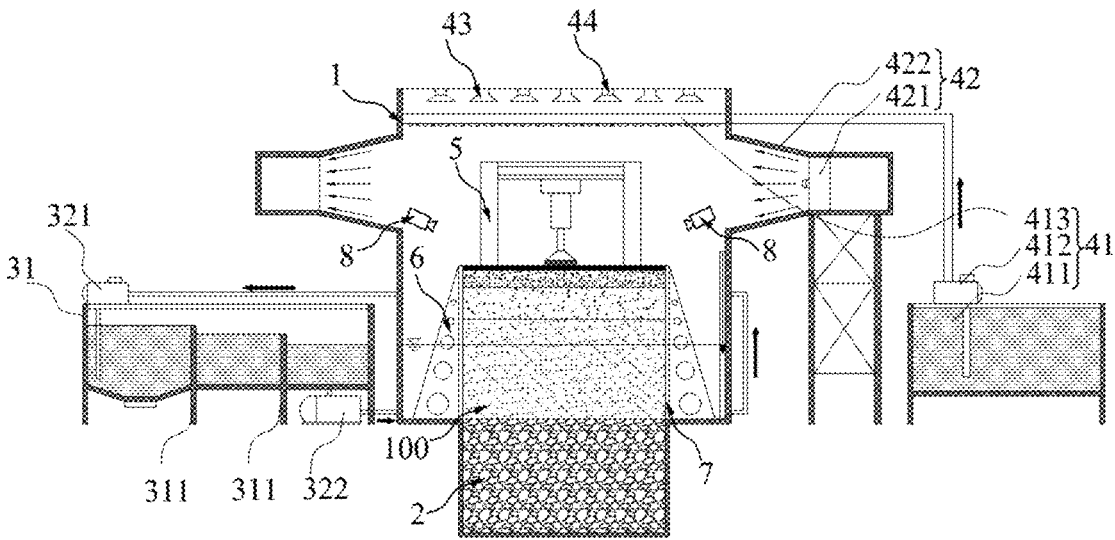
FIG. 1 is a diagram showing the structure of a marine dynamic environment simulation test system according to an embodiment of the present disclosure.

REFERENCE LIST 100 test piece
1 test chamber
2 simulated seabed structure model
31 sedimentation tank
311 baffle
321 first pump
322 second pump
41 rain and fog simulation mechanism
411 water box 412 third pump
413 spray plate
42 sea wind simulation mechanism
421 blower
422 duct
43 ultraviolet spotlight
44 high temperature spotlight
5 force loading device
6 reaction force support
7 silt filter plate
8 camera

DETAILED DESCRIPTION

The technical solutions of the present disclosure are described clearly and completely hereinafter in conjunction with drawings. Apparently, the described embodiments are part, not all, of embodiments of the present disclosure. Based on embodiments of the present disclosure, all other embodiments obtained by those of ordinary skill in the art without creative work are within the scope of the present disclosure.

In the description of the present disclosure, it is to be noted that orientations or position relations indicated by terms such as "center", "upper", "lower", "left", "right", "vertical", "horizontal", "in", and "out" are based on the drawings. These orientations or position relations are intended only to facilitate and simplify the description of the present disclosure and not to indicate or imply that a device or element referred to must have such particular orientations or must be configured or operated in such particular orientations. Thus, these orientations or position relations are not to be construed as limiting the present disclosure. In addition, terms such as "first" and "second" are used only for the purpose of description and are not to be construed as indicating or implying relative importance. Terms "first position" and "second position" are two different positions. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the present disclosure, it is to be noted that unless otherwise expressly specified and limited, the term "mounted", "connected to each other", or "connected" should be construed in a broad sense as securely connected, detachably connected, or integrally connected; mechanically connected or electrically connected; directly connected to each other or indirectly connected to each other via an intermediary; or interconnected between two components. For those of ordinary skill in the art, specific meanings of the preceding terms in the present disclosure may be understood based on specific situations.

The embodiments of the present disclosure are described in detail below, and examples of the embodiments are illustrated in the drawings, where the same or similar reference numerals indicate the same or similar elements or elements having the same or similar functions. The embodiments described below with reference to the drawings are merely exemplary and intended to explain the present disclosure, and are not to be construed as limiting the present disclosure.

As shown in FIG. 1, the embodiment provides a marine dynamic environment simulation test system and a test method. The system includes a test chamber 1, a seawater erosion unit, a climate simulation unit and a force loading device 5. The bottom of the test chamber 1 is provided with a simulated seabed structure model 2 for supporting a test piece 100. The seawater erosion unit includes a sedimentation tank 31 containing seawater and a circulation mechanism. The circulation mechanism is capable of making the seawater in the sedimentation tank 31 circulate in the sedimentation tank 31 and the test chamber 1 and controlling the water level and the flow rate of the seawater in the test chamber. The climate simulation unit is capable of performing at least one of ultraviolet irradiation, high temperature irradiation, sea wind simulation or rain or fog simulation on the test piece 100. The force loading device 5 is configured to load force in a preset direction on the test piece 100. Island reef infrastructure and subsea tunnels are in the marine environment for a long time, which has a serious impact on the structures and service life of the island reef infrastructure or the subsea tunnels. Therefore, it is necessary to research on the structure of the marine environment by using the system. Firstly, the test piece 100 is prepared according to the structures of the island reef infrastructure or the subsea tunnels, where the test piece 100 has the same composition and is produced by the same construction technology as the island reef infrastructure or the subsea tunnels; the required seawater is prepared in the sedimentation tank 31; then, the simulated seabed structure model 2 is arranged in the test chamber 1, where the simulated seabed structure model 2 has the same structure as the real seabed; the test piece 100 is arranged on the simulated seabed structure model 2; the test piece 100 is exposed to a seawater erosion environment; the test piece 100 is exposed to a preset climate environment; a loading test is performed on the test piece 100 through the force loading device 5, where the force loading device 5 may simulate the different loads on the island reef infrastructure or the subsea tunnels. Through the test system and the test method, the force loading test in the complex marine climate environment can be simulated, which is convenient for people to research on the island reef infrastructure or the subsea tunnels.

Optionally, multiple baffles 311 are sequentially disposed in the sedimentation tank 31, the multiple baffles 311 divide the sedimentation tank 31 into multiple accommodation cavities, and the multiple baffles 311 sequentially decrease in height in a vertical direction. In the embodiment, the multiple accommodation cavities have different heights. The circulation mechanism firstly injects the seawater into the accommodation cavity having the highest height, and the water level of the seawater gradually rises. When the water level reaches the height of the baffle 311, the seawater flows from one side of the baffle 311 to the next accommodation cavity, and then the seawater finally enters the accommodation cavity having the lowest height. At this time, the circulation mechanism sucks the seawater in the accommodation cavity having the lowest height into the test chamber 1. In this process, the silt in the seawater in each accommodation cavity gradually sinks, so that the seawater is purified. Preferably, since the seawater in the accommodation cavity having the highest height is the seawater which has just been pumped from the test chamber 1 and thus has more silt, so that more silt exists in the accommodation cavity having the highest height. For this reason, the bottom of the accommodation cavity having the highest height is provided with a sewage outlet which is generally in a closed state. When the sedimentation tank 31 is cleaned, the sewage outlet is opened, and the silt in the accommodation cavity having the highest height is cleaned through the sewage outlet. In other embodiments, the bottom of each accommodation cavity may be provided with a sewage outlet, respectively.

Optionally, the circulation mechanism includes a first water pump 321 and a second water pump 322. A water inlet of the first water pump 321 communicates with a water outlet of the test chamber 1, an accommodation cavity formed by the sedimentation tank 31 and a baffle 311 which is the highest in the vertical direction communicates with a water outlet of the first water pump 321, an accommodation cavity formed by the sedimentation tank 31 and a baffle 311 which is the lowest in the vertical direction communicates with a water inlet of the second water pump 322, and a water outlet of the second water pump 322 communicates with a water inlet of the sedimentation tank 31. In the embodiment, the water level and the flow rate in the test chamber 1 can be regulated by controlling the respective powers of the first water pump 321 and the second water pump 322. Specifically, the first water pump 321 is the same as the second water pump 322. When the first water pump 321 and the second water pump 322 has the same output power, the water level in the test chamber 1 remains constant, and the water flow rate can be adjusted according to the power of the first water pump 321 and the second water pump 322. When the output power of the first water pump 321 is greater than the output power of the second water pump 322, the water level in the test chamber 1 is in a falling state. When the output power of the first water pump 321 is less than the output power of the second water pump 322, the water level in the test chamber 1 is in a rising state. The marine environment can be simulated by adjusting the water level and the water flow in the test chamber 1. Specifically, the water inlet and water outlet of the test chamber 1 are arranged symmetrically to ensure that erosive ions in the seawater are uniformly distributed in the sample chamber. Optionally, the circulation mechanism further includes a water level sensor and a flow rate sensor, where the water level sensor and the flow rate sensor are both disposed in the test chamber 1 for respectively measuring the water level and the flow rate of the seawater in the test chamber 1.

Optionally, the marine dynamic environment simulation test system further includes multiple reaction force supports 6 and multiple silt filter plates 7. The multiple reaction force supports 6 respectively support the multiple silt filter plates 7 to make the multiple silt filter plates 7 form a test cavity, so that the test cavity encloses the test piece 100. In the embodiment, the reaction supports 6 support the corresponding silt filter plates 7, so that the silt filter plates 7 abut the test piece 100. The silt filter plates 7 allow the seawater to enter the test cavity while preventing the silt on the test piece 100 from leaking out through the silt filter plates 7.

Optionally, the climate simulation unit includes a rain and fog simulation mechanism 41. The rain and fog simulation mechanism 41 includes a water box 411, a third water pump 412 and a spray plate 413, the spray plate 413 is disposed in the test chamber 1 and located on the side of the test piece 100 away from the simulated seabed structure model 2, a water inlet of the third water pump 412 communicates with the water box 411, and a water outlet of the third water pump 412 communicates with the spray plate 413. In the embodiment, the third water pump 412 pumps the water in the water box 411 to the spray plate 413, and the spray plate 413 may spray rainwater or fog.

Optionally, the test chamber 1 is provided with two opposite vents. The climate simulation unit includes a sea wind simulation mechanism 42, where the sea wind simulation mechanism 42 includes a blower 421 and a duct 422, two ends of the duct 422 respectively communicate with the two vents of the test chamber 1, the two vents are respectively set as a trumpet shape, and the blower 421 is disposed at one of the two ends of the duct 422. In the embodiment, the duct 422 communicates with the two vents to form the circulation duct 422. The blower 421 is disposed at one end of the duct 422, and the blower 421 may generate circulation wind in the test chamber 1. Specifically, the two ends of the duct 422 are set as a trumpet shape, so that the wind speeds in the duct 422 are uniform and stable.

In a preferable technical solution of the marine dynamic environment simulation test system, the climate simulation unit includes multiple ultraviolet spotlights 43 and multiple high temperature spotlights. The multiple ultraviolet spotlights 43 are configured to perform ultraviolet irradiation on the test piece 100, and the multiple high temperature spotlights 44 are configured to perform high temperature irradiation on the test piece 100.

Optionally, multiple cameras 8 are further included for photographing the test piece 100. In the embodiment, the multiple cameras 8 are spaced apart along the circumferential direction of the test piece 100, so that surface crack characteristics of the model can be monitored in real time.

As shown in FIG. 2, the embodiment further provides a test method performed through the marine dynamic environment simulation test system of any one of the preceding solutions. The test method includes steps described below.

In step 110, the seawater is prepared in the sedimentation tank 31.

Seawater is a very complex dielectric system, the buffer capacity of which depends on the association equilibrium of each ion pair. The major ion pairs existing in seawater include Ca, Mg, $HCO_3$, $CO_3$, $HPO_4$, etc. Generally, artificial seawater is prepared by using a formulation.

In this step, optional formulations include formulation one and formulation two described below.

In formulation one, the concentration of ion pairs satisfies: the concentration of NaCl is 3.0 g/100 ml, the concentration of KCl is 0.08 g/100 ml, the concentration of $CaCl_2$ is 0.13 g/100 ml, the concentration of $MgSO_4$ is 0.66 g/100 ml and the concentration of $NaHCO_3$ is 5 g/100 ml.

In formulation two, the concentration of ion pairs satisfies: the concentration of NaCl is 3.0 g/100 ml, the concentration of KCl is 0.08 g/100 ml, the concentration of $CaCl_2$ is 0.13 g/100 ml, the concentration of $MgCl_2$ is 0.34 g/100 ml, the concentration of $MgSO_4$ is 0.66 g/100 ml, and the concentration of $NaHCO_3$ is 0.5 g/100 ml.

In step 120, the simulated seabed structure model 2 is arranged in the test chamber 1.

In this step, seabed structures (tectonic fault zones, limestone caves, etc.) and the seabed rock and soil environment (sludge, sandy soil, rock, etc.) are simulated according to actual situations and arranged in the test chamber 1. The seawater is injected into the test chamber 1 to be flush with the bottom of the environmental box, and the test chamber 1 is allowed to stand for 24 hours to ensure the saturation state of the seabed structure model 2.

In step 130, the test piece 100 is arranged on the simulated seabed structure model 2.

In this step, the reaction force supports 6 and the silt filter plates 7 are assembled and then layered in the sample chamber according to the design scheme of the test piece 100.

In step 140, the test piece 100 is exposed to a marine erosion environment.

In this step, the seawater is injected to the test chamber 1 through the circulation mechanism, so that the part of the test piece 100 below the seawater level line is completely immersed in the seawater, and the test chamber 1 is allowed to stand for 24 hours to ensure that the test chamber 1 reaches the saturation state.

In step 150, the test piece 100 is exposed to a preset climate environment.

In this step, the climate simulation unit is adjusted according to the preset climate environment.

In step 160, a loading test is performed on the test piece 100 through the force loading device 5.

In this step, after the initial environment working situation is set, the stress situation of the test piece 100 is simulated according to actual situations, and the loading test of the test piece 100 under the marine environment condition is implemented.

Apparently, the preceding embodiments of the present disclosure are only illustrative of the present disclosure and are not intended to limit the implementations of the present disclosure. For those of ordinary skill in the art, changes or alterations in other different forms may also be made based on the preceding description. Implementations of the present disclosure cannot be and do not need to be exhausted herein. Any modifications, equivalent substitutions, and improvements made within the spirit and principle of the present disclosure fall within the scope of the claims of the present disclosure.

What is claimed is:

1. A marine dynamic environment simulation test system, comprising:
   a test chamber (1), wherein a bottom of the test chamber (1) is provided with a simulated seabed structure model (2) for supporting a test piece (100);
   a seawater erosion unit comprising a sedimentation tank (31) containing seawater and a circulation mechanism, wherein the circulation mechanism is capable of making the seawater in the sedimentation tank (31) circulate in the sedimentation tank (31) and the test chamber (1) and controlling a water level and a flow rate of the seawater in the test chamber (1);
   a climate simulation unit capable of performing at least one of ultraviolet irradiation, high temperature irradiation, sea wind simulation or rain or fog simulation on the test piece (100); and
   a force loading device (5) configured to load force in a preset direction on the test piece (100).

2. The system according to claim 1, wherein a plurality of baffles (311) are sequentially disposed in the sedimentation tank (31), divide the sedimentation tank (31) into a plurality of accommodation cavities, and sequentially decrease in height in a vertical direction.

3. The system according to claim 2, wherein the circulation mechanism comprises a first water pump (321) and a second water pump (322);
   a water inlet of the first water pump (321) communicates with a water outlet of the test chamber (1), and a water outlet of the first water pump (321) communicates with an accommodation cavity formed by the sedimentation tank (31) and a baffle (311) which is the highest in the vertical direction among the plurality of baffles (311); and a water inlet of the second water pump (322) communicates with an accommodation cavity formed by the sedimentation tank (31) and a baffle (311) which is the lowest in the vertical direction among the plurality of baffles (311), and a water outlet of the second water pump (322) communicates with a water inlet of the sedimentation tank (31).

4. The system according to claim 3, wherein the circulation mechanism further comprises a water level sensor and a flow rate sensor which are each disposed in the test chamber (1) for respectively measuring the water level and the flow rate of the seawater in the test chamber (1).

5. The system according to claim 1, further comprising a plurality of reaction force supports (6) and a plurality of silt filter plates (7), wherein the plurality of reaction force supports (6) respectively support the plurality of silt filter plates (7) to make the plurality of silt filter plates (7) form a test cavity, so that the test cavity encloses the test piece (100).

6. The system according to claim 1, wherein the climate simulation unit comprises a rain and fog simulation mechanism (41) which comprises a water box (411), a third water pump (412) and a spray plate (413);

the spray plate (413) is disposed in the test chamber (1) and located on a side of the test piece (100) away from the simulated seabed structure model (2);

a water inlet of the third water pump (412) communicates with the water box (411); and a water outlet of the third water pump (412) communicates with the spray plate (413).

7. The system according to claim 1, wherein the test chamber (1) is provided with two opposite vents; and the climate simulation unit comprises a sea wind simulation mechanism (42) which comprises a blower (421) and a duct (422), two ends of the duct (422) respectively communicate with the two vents of the test chamber (1), the two vents are respectively set as a trumpet shape, and the blower (421) is disposed at one of the two ends of the duct (422).

8. The system according to claim 1, wherein the climate simulation unit comprises a plurality of ultraviolet spotlights (43) and a plurality of high temperature spotlights (44), wherein the plurality of ultraviolet spotlights (43) are configured to perform ultraviolet irradiation on the test piece (100), and the plurality of high temperature spotlights (44) are configured to perform high temperature irradiation on the test piece (100).

9. The system according to claim 1, further comprising a plurality of cameras (8) for photographing the test piece (100).

10. A test method, applied to the system according to claim 1, comprising:

preparing the seawater in the sedimentation tank (31);

arranging the simulated seabed structure model (2) in the test chamber (1);

arranging the test piece (100) on the simulated seabed structure model (2);

exposing the test piece (100) to a marine erosion environment;

exposing the test piece (100) to a preset climate environment; and performing a loading test on the test piece (100) through the force loading device (5).

* * * * *